United States Patent
Koester, Jr. et al.

[11] Patent Number: 5,090,097
[45] Date of Patent: Feb. 25, 1992

[54] PLASTIC CLIP

[76] Inventors: Frank A. Koester, Jr., 12142 Sage Glen, Maryland Heights, Mo. 63043; Daniel R. Koester, 10766 Oak Ave., St. Louis, Mo. 63114

[21] Appl. No.: 115,244

[22] Filed: May 28, 1991

[51] Int. Cl.⁵ .......................................... A44B 21/00
[52] U.S. Cl. ...................................... 24/552; 24/67.9; 24/543; 24/563; 43/42.43
[58] Field of Search ................ 24/552, 541, 543, 563, 24/555, 549, 553, 554, 67.9, 67.11, 129 B, 329; 43/42.43, 43.6, 4

[56] References Cited

U.S. PATENT DOCUMENTS

| | | | |
|---|---|---|---|
| 168,332 | 10/1875 | Hill | 24/563 |
| 344,110 | 6/1886 | Johnson et al. | 24/563 |
| 752,185 | 2/1904 | Sibley | 24/563 |
| 1,255,118 | 1/1918 | McRoberts | 24/552 |
| 1,396,428 | 11/1921 | Helzman et al. | 24/563 |
| 1,478,530 | 12/1923 | Rooney | 24/551 |
| 2,478,376 | 8/1949 | Swart | 24/66 |
| 2,547,122 | 4/1951 | Neston | 24/551 |
| 2,583,020 | 1/1952 | Smith | 24/137 |
| 2,885,814 | 5/1959 | Schlador | 43/4 |
| 2,916,845 | 12/1959 | Grindstaff | 43/4 |
| 2,928,152 | 3/1960 | Henneberry, Jr. | 24/139 |
| 2,929,166 | 3/1960 | Sneide | 43/4 |
| 3,140,519 | 7/1964 | Johnson | 24/563 |
| 3,164,067 | 1/1965 | Hurst | 43/4 |
| 3,404,435 | 10/1968 | Freundlich | 24/66 |
| 3,422,391 | 1/1969 | Thomson | 24/329 |
| 3,572,428 | 3/1971 | Monaco | 165/80 |
| 3,862,507 | 1/1975 | Martyn | 43/4 |
| 3,975,853 | 8/1976 | Aaron | 43/4 |
| 4,055,874 | 11/1977 | Brown | 24/67.9 |
| 4,658,822 | 4/1987 | Kees, Jr. | 128/325 |
| 4,660,558 | 4/1987 | Kees, Jr. | 128/325 |
| 4,777,950 | 10/1988 | Kees, Jr. | 128/325 |
| 4,800,666 | 1/1989 | Lukehart | 43/4 |
| 4,843,753 | 7/1989 | Mace | 43/4 |

Primary Examiner—Victor N. Sakran
Attorney, Agent, or Firm—Grace J. Fishel

[57] ABSTRACT

A one-piece plastic clip with broad jaws for gripping an object over a long area. The clip has arms with an upper and lower surface and ends with a plurality of complementary offset teeth. In unstressed condition, the clip is not under tension. When kinetic energy is stored in the clip, the arms are pinched together and the teeth intermesh and cross over at an angle forming broad jaws. The jaws grip the object between the angled upper surfaces of the arms below the cross over point of the teeth.

6 Claims, 1 Drawing Sheet

PLASTIC CLIP

The present invention relates to a one-piece plastic clip with broad jaws for distributing the compressive gripping force on an object held therein. More particularly, this invention relates to a clip having opposing arms with a plurality of offset complementary teeth that intermesh and cross over to form a broad jaw for gripping an object.

BACKGROUND OF THE INVENTION

Various clips are described in the patent literature for exerting a gripping force over a long area, for example, for holding the folded edge of a potato chip bag, for holding a fishing worm and so forth. Many such clips are variants of a standard binder clip used for holding papers and are made of several parts including a spring to bias the clip normally closed. U.S. Pat. No. 2,885,814 to Schlador is illustrative of a modified binder clip with padded, elongated jaws for gripping a worm. Various "chip clips" for holding the folded edge of snack bags are currently offered for sale and are also prior art to the present invention.

One problem with binder clips made of metal is that they rust and are aesthetically unpleasing or can damage the object being held. Even if they are made of rust resistant material, they are mechanically complicated with recesses, springs and other areas which are difficult to clean. In addition, binder clips are always under some tension which in time tends to weaken the spring action.

SUMMARY OF THE INVENTION

A one-piece plastic clip is U-shaped in cross section in unstressed condition and comprises a rectangular piece folded over to provide a pair of opposing arms joined by an integral bight portion. The arms have free ends and upper and lower surfaces. The free ends of the arms have a plurality of complementary offset teeth that in operative position intermesh and cross over at an angle forming broad jaws. A thing to be held is gripped in the jaws between the angled upper surfaces of the arms below the cross over point of the teeth.

An object of the present invention is to provide a one-piece plastic clip for exerting a gripping action over a long area such that the gripping force is distributed across the object which is not squashed, shredded or the like.

Another object is to provide a one-piece plastic clip which is mechanically uncomplicated and which can be readily cleaned.

Still another object is to provide a one-piece plastic clip which is not under tension when it is not in use.

Other objects and features of the invention will be in part apparent and in part pointed out hereinafter.

The invention accordingly comprises the constructions hereinafter described and their equivalents, the scope of the invention being indicated in the subjoined claims.

BRIEF DESCRIPTION OF THE DRAWINGS

In the accompanying drawings, in which one of various possible embodiments of the invention is illustrated, corresponding reference characters refer to corresponding parts throughout the several views of the drawings and in which.

DETAILED DESCRIPTION OF THE INVENTION

Figure 2:
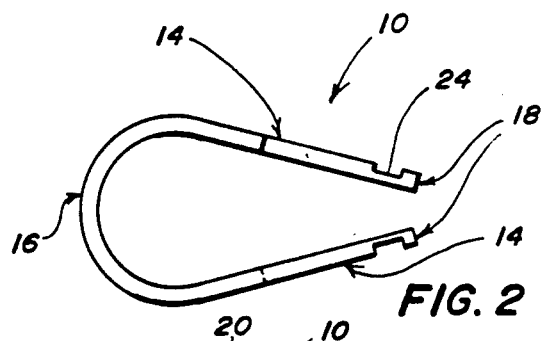
FIG. 2 is a side elevation view of the clip in unstressed condition.
Figure 5:
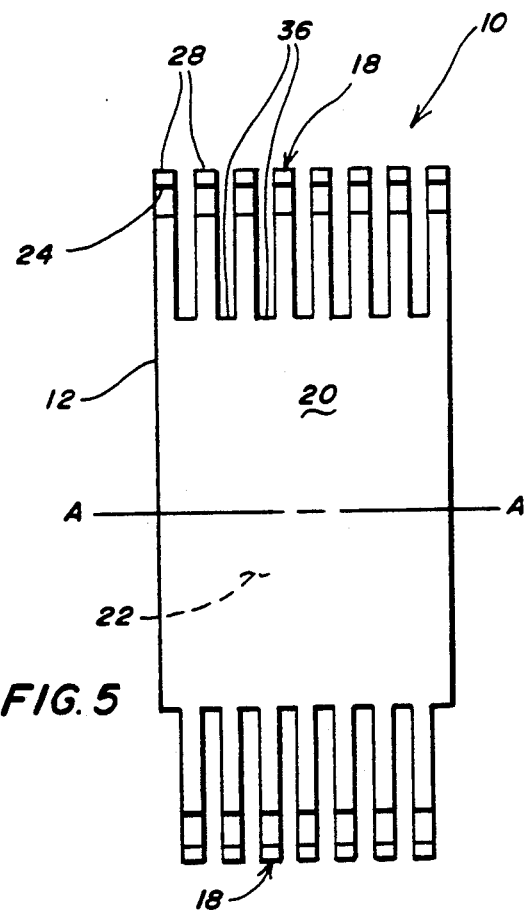
FIG. 5 is a plan view of a rectangular piece showing the clip in flattened condition.

Referring to the drawings, a one-piece plastic clip 10 in accordance with the present invention is U-shaped in cross-section as shown in FIG. 2 when it is in unstressed condition. As shown in FIG. 5, clip 10 is formed from a rectangular piece 12 of resilient plastic material folded over along line A—A to provide a pair of opposing arms 14 joined by an integral bight portion 16. This can be accomplished by molding or bending rectangular piece 12 in an arcuate shape. Arms 14 have free ends 18 and upper and lower surfaces 20, 22, respectively. The plastic material resiliently biases the clip such that arms 14 are resistant to being pinched together. In unstressed condition, however, clip 10 is not under tension.

Figure 1:
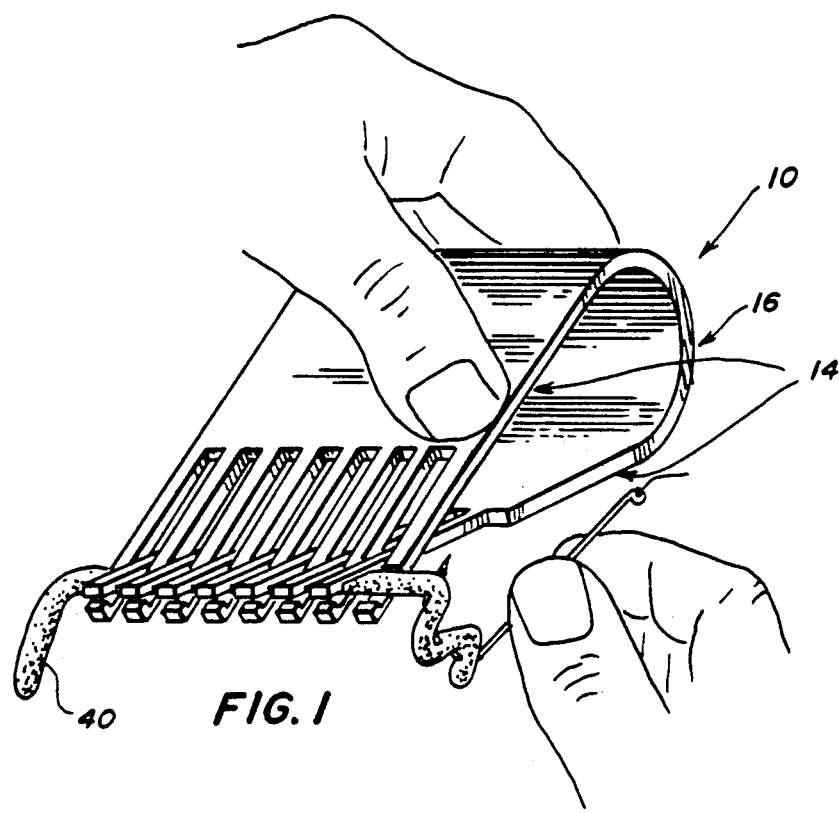
FIG. 1 is a perspective view of a one-piece plastic clip in accordance with the present invention in use as a holder for a fishing worm.
Figure 3:
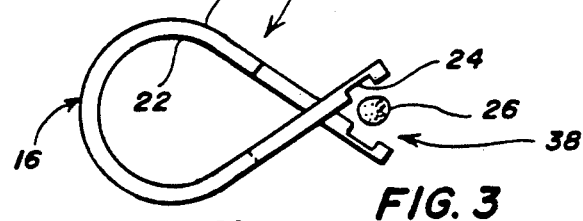
FIG. 3 is a side elevation view of the clip in process of being clipped over an object.
Figure 4:
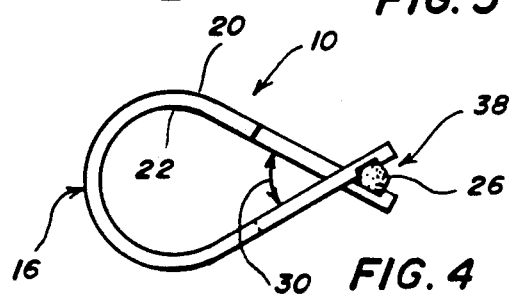
FIG. 4 is a side elevation view of the clip clipped over an object.

Free ends 18 of arms 14 may be provided with notches 24 on their upper surfaces 20 adjacent their free ends for gripping an object 26. Free ends 18 have a plurality of complementary teeth 28 that in operative position as shown in FIGS. 1 and 3-4, intermesh and cross over at an angle 30. The teeth on opposing arms 14 are offset from each other such that rectangular piece 12 is not laterally twisted when the teeth are intermeshed. Teeth 28 are preferably squared off projections connected by squared off pockets 36 regularly spaced along the free ends 18 of arms 14. Teeth 28 are substantially longer than they are wide and pockets 36 are generally complementary in width and depth to the teeth. If intermeshing teeth are to be spaced apart, however, pockets 36 are wider than teeth 28.

When teeth 28 are intermeshed, broad jaws 38 are formed for gripping object 26 between upper surfaces 20 of arms 14 below the cross over point of the teeth. The extent to which jaws 38 can be opened depends on the amount that teeth 28 can be intermeshed which is controlled by the depth of pockets 36. The deeper pockets 36 are, the wider jaws 38 can be opened with the limitation that if pockets 36 are too deep, arms 14 will be unduly weakened. The function of broad jaws 38 is to distribute the compressive gripping force across the object being held.

In operation, clip 10 is U-shaped in cross-section in starting condition as shown in FIG. 2. When arms 14 are pinched together along their upper surfaces 20, teeth 28 are intermeshed and cross over. As arms 14 are compressed against the resistance of the resilient material, kinetic energy is stored in the clip as potential energy. As shown in FIG. 3, jaws 38 (and notches 24 if present) are positioned over object 26. When pressure on arms 14 is released, part of the potential energy stored in clip 10 is converted back into kinetic energy closing jaws 38. As shown in FIG. 4, jaws 38 close as teeth 28 unmesh until they are stopped by object 26 which is gripped between upper surfaces 20 of arms 14 below the cross over point of teeth 28. Broad jaws 38 distribute the compressive gripping force of clip 10 across the object being held so that the object (such as worm 40 in FIG. 1) is not squashed or shredded.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A one-piece plastic clip having a U-shape in cross-section in unstressed condition comprising a rectangular piece folded over to provide a pair of opposing spaced apart arms joined by an integral bight portion, said arms having free ends and upper and, lower surfaces, said free ends having a plurality of complementary offset teeth that in operative position intermesh and cross over at an angle forming broad jaws for gripping an object between the angled upper surfaces of the arms below the cross over point of the teeth whereby the compressive gripping force of said jaws is distributed across the object held therein.

2. The clip of claim 1 wherein the teeth are squared off projections connected by squared off pockets.

3. A one-piece plastic clip having a U-shape in cross-section in unstressed condition comprising a rectangular piece folded over to provide a pair of opposing spaced apart arms joined by an integral bight portion, said arms having free ends and upper and lower surfaces, said free ends having a plurality of regularly spaced, complementary, offset teeth that intermesh and cross over at an angle forming broad jaws for gripping an object between the angled upper surfaces of the arms below the cross over point of the teeth, said teeth being connected by pockets, whereby the compressive gripping force of said jaws is distributed across the object held therein.

4. The clip of claim 3 wherein the teeth are squared off projections and are substantially longer than they are wide and wherein the pockets are generally complementary in shape, width and depth to the teeth.

5. The clip of claim 4 wherein the arms have aligned notches on their upper surfaces adjacent their free ends for gripping the object.

6. A one-piece plastic clip having a U-shape in cross-section in unstressed condition comprising a rectangular piece folded over to provide a pair of opposing spaced apart arms joined by an integral bight portion, said arms having free ends and upper and lower surfaces, said free ends having a plurality of regularly spaced, complementary, offset teeth that intermesh and cross over at an angle forming broad jaws for gripping an object between the angled upper surfaces of the arms below the cross over point of the teeth, said teeth being substantially longer than they are wide and connected by pockets which are generally complementary in shape, width and depth to the teeth, whereby the jaws open widely and the compressive gripping force is distributed across the object held therein.

* * * * *